United States Patent [19] [11] 3,985,536
Abbe et al. [45] Oct. 12, 1976

[54] METHOD FOR THE PREPARATION OF AN ORGANIC SOIL CONDITIONER FROM PEAT-MOSS

[76] Inventors: Ryonosuke Abbe; Motoko Abbe, both of 92-5, Miharu-cho 5-chome, Yokosuka, Kanagawa, Japan

[22] Filed: Jan. 6, 1975

[21] Appl. No.: 538,810

[30] Foreign Application Priority Data
June 24, 1974 Japan................................ 49-71369

[52] U.S. Cl..................................... 71/24; 210/54; 71/25
[51] Int. Cl.² ......................................... C05F 11/02
[58] Field of Search................ 71/24, 25, 37, 42–44; 210/54

[56] References Cited
UNITED STATES PATENTS
2,093,047 9/1937 Hudig et al. ........................ 71/24 X
3,264,084 8/1966 Karcher ................................. 71/24
3,306,714 2/1967 Goren ........................... 210/54 R X FOREIGN PATENTS OR APPLICATIONS
1,123,265 2/1962 Germany .............................. 71/24
34,174 3/1967 Japan..................................... 71/24
1,111,798 5/1968 United Kingdom................... 71/24

Primary Examiner—John Adee
Assistant Examiner—Ferris H. Lander
Attorney, Agent, or Firm—Woodhams, Blanchard and Flynn

[57] ABSTRACT

A method for the preparation of soil conditioners, which comprises the steps of adding alkaline earth metal salts to a solution of alkaline extract of an peat-moss and humic acid which is contained in peat-moss thereby to form flocs of the humic acid salt thereof, further adding an organic coagulant to said solution thereby to coagulate said flocs coarsely, filtering the thus treated solution, and drying the resulting condensate.

23 Claims, No Drawings

METHOD FOR THE PREPARATION OF AN ORGANIC SOIL CONDITIONER FROM PEAT-MOSS

BACKGROUND OF THE INVENTION a. Field of the Invention

The present invention relates to a method for preparing soil conditioners having a superb efficiency from peat-moss. To be more precise, it relates to a method for preparing soil conditioners having excellent properties, which comprises the steps of adding alkaline earth metal salts to a solution of alkaline extract of an peat-moss, an alkaline of various humic acids separated from said extract solution or a mixture of these alkaline solutions thereby to form flocs, further adding an organic coagulant to the thus flocculated solution thereby to coagulate said flocs coarsely, and subsequently collecting and drying the resulting condensate. As soil conditioners, there are known varieties of commercial articles sold at high prices, but few of them have high efficiency in proportion to their prices. The present invention is intended to provide a low-priced soil conditioner having superb efficiency by utilizing peat-moss.

b. Description of the Prior Art

There is a well-known method for the preparation of a soil conditioner from peat-moss as disclosed in U.S. Pat. No. 3,321,296 as well as Canadian Pat. No. 813822. This known method is so devised that the peat-moss is either made to react with calcium hydroxide or magnesium hydroxide at an elevated pressure as well as temperature or made to react with calcium hydroxide or magnesium hydroxide at an elevated temperature in the presence of sodium hydroxide or potassium hydroxide to act as a catalyst thereby to produce a paste-like mixture, and the resulting product is dried and crushed to serve as the soil conditioner.

The soil conditioner prepared by this known method is indeed significant in that peat-moss existing on the earth in great quantities has been utilized as the starting material for preparing a valuable soil conditioner, and the product soil conditioner admittedly has a fairly superior efficiency. However, the present inventors have found the fact that this soil conditioner still has some defects. The first defect is that the effect of soil conditioning by the use of this soil conditioner considerably varies with the kinds of plants to be grown. The second defect is that it is required to apply a fairly large quantity of the soil conditioner for the purpose of effective soil conditioning. And, the third defect is that it is required to apply an elevated temperature and pressure at the time of preparing the soil conditioner and the drying process is lengthy and requires heats.

SUMMARY OF THE INVENTION

The present invention is intended to overcome the foregoing defects of the known method. According to the researches conducted by the present inventors, some peat-moss contains a considerable amount of vegetable matter not turned directly into humus as well as earth and sand, and therefore, it is natural from the technical point of view that, in the case of soil conditioners prepared by employing a mixture comprising pure peat-moss, residual vegetable matter not turned directly into humus, earth and sand, etc. as the material, the products vary in their self-conditioning property. This fact has no doubt a bearing on the irregularity of the efficiency of the soil conditioners prepared by the known method.

As a result of a series of researches, the present inventors have found the following facts:

When a raw peat-moss with much impurities is treated with a strong alkaline solution thereby to separate alkali salt of pure peat-moss, or alkali salt of humic acid, in the state of a solution from the residual vegetable matter not turned directly into humus, earth and sand, etc. and then a solution of alkaline earth metal salts like calcium chloride is added to this extract solution, all the extracts form flocs of humic acid·Ca, humic acid·Mg or the like. On the other hand, when said alkaline extract solution is imparted with acidity by adding a strong acid thereto, a true humic acid together with a partially humified material precipitates and separates. This precipitate also forms flocs when it is dissolved again with alkali and then mixed with a solution of alkaline earth metal salts. In the residual liquid left after treating the alkaline extract solution with a strong acid and removing the true humic acid together with partially humified material therefrom, there still remains fulvic acid, and, by passing this acid residual liquid through a dialysis tank charged with ion-exchange resin, a fulvic acid solution can be obtained. This solution also forms flocs when a solution of alkaline earth metal salts is added thereto.

All of the foregoing three kinds of flocs can display a superb soil-conditioning efficiency, and particularly the soil-conditioning ability of a soil conditioner obtained from the flocs consisting of true humic acid·Ca is conspicuous. Therefore, the preparation of soil conditioners of various grades can be expected when the foregoing three kinds of alkaline solutions are properly admixed so as to form flocs. In this connection, there are instances where the fine particles of the produced humic acid·Ca or humic·Mg are hard to flocculate owing to the kind of the material peat-moss employed. The reason for this is yet to be theoretically clarified, but it is considered attributable to the difference of the degree of conversion of the residual vegetable matter into humus.

The present invention has been achieved on the basis of the foregoing knowledge, and renders it possible to provide a soil conditioner having a superb efficiency through the process comprising effecting the coagulation and separation by the use of an organic coagulant for the purpose of massively coagulating fine particles of the produced humic acid salt and expediting the filtration and separation of said salt. The operation in the method of the present invention is conducted at a temperature in the vicinity of room temperature and requires no elevation of pressure, so that it is possible to effect mass treatment and reduce the cost. Besides, as the product is free of vegetable matter not turned directly into humus as well as earth and sand, the soil-conditioning effect per unit weight thereof is great. And, a granular product convenient for handling can be obtained by merely drying the flocs resulting from said coagulation. In short, the present invention brings various advantages such as discussed hereinabove.

In the following will be given further elucidation of the present invention.

DESCRIPTION OF THE PREFERRED EMBODIMENTS

Peat-moss exits in large quantities in the wet lands of the cold northern districts and in the marshes of the tropics. The peat-moss existing in the former area and that in the latter area are different in the constituent vegetables and origin thereof, but both are closely akin to each other in composition. However, the well-known peat-moss is one existing in the wet lands of the cold northern districts, which is by far larger in quantity. Therefore, the following elucidation will center round the peat-moss produced from the cold northern districts.

Peat-moss is a product that results from of the accumulation of the withered marshy plants under water and their conversion into humus after a long period of time. The remainder of the peat-moss after removing the foreign elements such as water, earth and sand therefrom is composed of humus consisting of vegetable matters not turned directly into humus, partially humified material, true humic acid, and fulvic acid, and comprises miscellaneous substances resulting from the humification and decomposition of lignin and hemicellulose contained in the vegetable body. The peat-moss usually contains some quantity of earth and sand and a large quantity of water (the content of water is several times, more than 10 times on some occasion, as much as the peat-moss). And, the constituents of the peat-moss other than the earth and sand and the vegetable matters dissolve in a strong alkali and form water insoluble flocs in the presence of alkaline earth metal salts or hydroxide.

In the present invention, the peat-moss is first subjected to the treatment with an aqueous solution of strong alkali, whereby the constituents thereof other than the earth and sand and the vegetable matters are dissolved and separated. As the applicable alkaline agent, there are caustic soda, caustic potash, ammonia, or compounds containing these substances, such as the red-mud to be obtained as a by-product at the time of manufacturing alumina. The use of the by-product red-mud arising from the aluminum industry means the utilization of an industrial waste, so that it has the merits that the cost of production can be reduced and a perfect elimination of the public nuisances attributable to the red-mud which has hitherto been abandoned in the seas or mountainous districts can be expected. The most popular alkaline agent is an aqueous solution of caustic soda, and there can be used red-mud containing about 10%, calculated as $Na_2O$, of alkaline composition. The alkaline composition is added to the extent of 3 – 10%, preferably 5–7%, by weight in terms of $Na_2O$ relative to the content of pure peat-moss (as dry peat-moss) in the material peat-moss. The aqueous solution of this alkaline composition is employed in the form of a concentrated aqueous solution (e.g., 10% concentration) for mixing with a raw peat-moss. The extraction of the pure peat-moss is effected at a temperature of less than 80° C, preferably at room temperature, while stirring. The time of treatment for the extraction is not more than 30 minutes. The filtration can be easily effected by the use of a conventional filtering means such as, for instance, vacuum filter tank.

The filtrate may be immediately admixed with alkaline earth metal salts thereby to form flocs, but it is usual to separate therefrom various substances differing in the degree of turning into humus.

When a strong acid such as sulfuric acid is added to the alkaline extract solution and the pH value is maintained to be 4, the true humic acid and partially humified material are separated to precipitate, so that this precipitate can be recovered through filtration by means of a vacuum filter tank or the like.

The solution after removing the true humic acid and partially humified material contains dissolved therein a large quantity of fulvic acid. Therefore, this solution is introduced into a dialysis tank charged with cation-exchange resin thereby to remove Glauber's salt and sulfuric acid therefrom and obtain a fulvic acid solution.

In the present invention, the foregoing alkaline extract solution of peat-moss, the true humic acid, partially humified material and fulvic acid solution separated from said extract solution are used, either individually or upon admixing, as the material for forming flocs. On this occasion, the separated substances are dissolved in alkali again and used.

The process of forming flocs is very simple. It suffices to add alkaline earth metal salts to an alkaline solution of an individual extract or admixed extracts of peat-moss and stir the mixture. The most popular substance to be applied for this purpose is calcium chloride. In order to form the humic acid·Ca most appropriately, it is advisable to measure the hydrogen ion concentration while adding the calcium chloride solution and stop adding it upon obtaining a pH value of 6.8–7.2.

Subsequent to the flocculation as above, by adding an organic coagulant to the solution, flocs are coarsely coagulated. This is for the purpose of facilitating the filtration and improving the condition of the product in due consideration of the fact that the speed of forming flocs varies with the kind of the material peat-moss as set forth above. As the applicable coagulant, there are, for instance, sodium alginate, carboxymethyl cellulose, polyacrylic amide, etc., and in the case of carboxymethyl cellulose, it suffices to add it by 1 g per 1 cubic meter of the solution to be treated.

The flocs after coagulation are separated from the motor liquor and then subjected to heat drying or natural drying.

The product resulting from the coagulation of flocs as separated from the mother liquor is in the state of a paste, but it becomes a powder when dried to reduce its moisture to 50–60%. The color of this product is dark brown. It has an almost insensible peculiar smell, but said smell is not offensive.

When the present product (moisture = 50–60%) is sprinkled over a land of 10 are to the extent of 50–100 Kg and the land is tilled lightly, even the acid soil or alkaline soil of inferior nature is converted into a soil suitable for the growth of plants. That is, the soil is sufficiently aerated, and the water permeability of the soil is improved. Accordingly, the absorptivity of the soil for fertilizer is promoted. Besides, the alkaline earth metal salt of humic acid seems to be a kind of metal chelate compound and this material ion is combined with water-molecule to form aquo ion, said groups being capable of holding the fertilizer in their position so that a farm whereon the present product has been sprinkled is free from the washout of fertilizer. Further, the present product is stable against microbes in the soil and is durable in the soil for 5–7 years. Therefore, in the case of applying it every year, the amount to be applied from the second year on suffices to be one third of the amount applied in the first year.

EXAMPLE

A raw peat-moss comprising ash content of 40% on the average and moisture of 90% relative to a pure peat-moss and a 10% aqueous solution of NaOH equivalent to 4.1 g of NaOH per 1 Kg of raw peat-moss were treated for 5 minutes by vigorously stirring within a reaction vat at room temperature. The thus treated solution was introduced into a vacuum filter tank thereby to divide it into insoluble matter and filtrate, Next, by adding sulfuric acid to said filtrate, the pH value was maintained to be 4, and the thus precipitated true humic acid and partially humified material were separated by means of the vacuum filter tank.

The solution after removing the separated substances was introduced into a dialysis tank provided with ion-exchange membrane, whereby a fulvic acid solution excluding $Na_2SO_4$ and $H_2SO_4$ was separated. The thus separated solution was turned to be alkaline by adding caustic soda thereto, and then neutralized to have the pH value of 7.2 by adding a $CaCl_2$ solution and stirring for 30 seconds, whereby fine flocs of fulvic acid·Ca were formed. Subsequently, by adding 1 g of carboxymethyl cellulose relative to 1000 l of the thus treated solution and stirring for 10 seconds, said flocs were coagulated to precipitate.

The true humic acid and partially humified material which had been separated by means of the vacuum filter tank were turned to be alkaline by adding a 10% aqueous solution of NaOH, and then neutralized by adding a $CaCl_2$ solution and stirring for 30 seconds, whereby fine flocs of humic acid·Ca were formed. Subsequently, by adding 1 g of carboxymethyl cellulose relative to 1000 l of the thus treated solution and stirring for 10 seconds, said flocs were coagulated to precipitate.

Meanwhile, when a 10% aqueous solution of NaOH was added to a raw peat-moss of good quality, there was obtained a uniform solution. Subsequent to forming flocs by adding a $CaCl_2$ solution to this solution, by further adding carboxymethyl cellulose to the thus treated solution, there were obtained coarse flocs of peat-moss·Ca of good quality.

Lastly, subsequent to forming a cake respectively by treating the respective coarse flocs of fulvic acid·Ca, true humic acid·partially humified material·Ca and superior-quality peat moss·Ca by the use of a hydroextractor, by drying these cakes, there were obtained powder products having a moisture of 50–60%.

The foregoing three varieties of humic acid·Ca powders are servable as soil conditioners of different efficiencies. Accordingly, these humic acid·Ca powders may be applied individually. However, in the case of conditioning a soil of particularly inferior quality such as the volcanic-ash containing soil, it can be turned into a chernozem-type soil, which is the most excellent soil, by applying a mixture of said superior-quality peat moss·Ca and true humic acid·partially humified material·Ca under the present invention.

What is claimed is:

1. A process for preparing an organic soil conditioner, which comprises the steps of:
   agitating, at a temperature of less than 80° C, a reaction mixture consisting essentially of peat moss and an aqueous solution of a strong alkali in an amount equivalent to form 3 to 10% by weight, calculated as $Na_2O$, based on water-free peat moss, for a period of time not more than 30 minutes effective to form an aqueous alkaline extract of said peat moss and filtering said reaction mixture to remove non-dissolved substances therefrom whereby to recover a filtrate consisting of said aqueous alkaline extract;
   adding to said filtrate an aqueous solution of an alkaline earth metal salt to substantially neutralize said filtrate whereby to form water-insoluble fine flocs of alkaline earth metal salts of the constituents of said extract, then adding to and mixing with the thus-treated filtrate an organic coagulant for said flocs whereby to coagulate said flocs;
   then filtering the coagulated flocs from said filtrate and drying said coagulated flocs to obtain a particulate material useful as an organic soil conditioner.

2. A process according to claim 1 wherein said aqueous solution of a strong alkali is an aqueous solution of caustic soda, caustic potash, ammonia or red mud by-product of the aluminum industry, or an industrial waste water of strong alkalinity.

3. A process according to claim 2 wherein said alkaline earth metal salt is a calcium or magnesium salt.

4. A process according to claim 2 wherein said alkaline earth metal salt is calcium chloride.

5. A process according to claim 1 wherein said organic coagulant is selected from the group consisting of sodium alginate, carboxymethyl cellulose or polyacrylic amide.

6. A process for preparing an organic soil conditioner, which comprises the steps of:
   agitating, at a temperature of less than 80° C, a reaction mixture consisting essentially of peat moss and an aqueous solution of a strong alkali in an amount equivalent to from 3 to 10% by weight, calculated as $Na_2O$, based on water-free peat moss, for a period of time not more than 30 minutes effective to form an aqueous alkaline extract of said peat moss and filtering said reaction mixture to remove non-dissolved substances therefrom whereby to recover a filtrate consisting of said aqueous alkaline extract;
   adding to said filtrate a strong acid in an amount effective to precipitate humic acid and partially humified material and to leave fulvic acid dissolved therein and then separating said precipitate from the liquid;
   adding to said precipitate an aqueous solution of a strong alkali to dissolve said precipitate, then adding to the thus-formed solution an aqueous solution of an alkaline earth metal salt to substantially neutralize said filtrate whereby to form water-insoluble fine flocs of alkaline earth metal salts of humic acid and partially humified material, then adding to and mixing with the thus-treated solution an organic coagulant for said flocs whereby to coagulate said flocs;
   then filtering the coagulated flocs from said filtrate and drying said coagulated flocs to obtain a particulate material useful as an organic soil conditioner.

7. A process according to claim 6 wherein said aqueous solution of a strong alkali is an aqueous solution of caustic soda, caustic potash, ammonia or red mud by-product of the aluminum industry, or an industrial waste water of strong alkalinity.

8. A process according to claim 7 wherein said alkaline earth metal salt is a calcium or magnesium salt.

9. A process according to claim 7 wherein said alkaline earth metal salt is calcium chloride.

10. A process according to claim 6 wherein said organic coagulant is selected from the group consisting of sodium alginate, carboxymethyl cellulose or polyacrylic amide.

11. A process according to claim 6 wherein said strong acid is hydrochloric acid or sulfuric acid.

12. A process for preparing an organic soil conditioner, which comprises the steps of:

agitating, at a temperature of less than 80° C, a reaction mixture consisting essentially of peat moss and an aqueous solution of a strong alkali in an amount equivalent to from 3 to 10% by weight, calculated as $Na_2O$, based on water-free peat moss, for a period of time not more than 30 minutes effective to form an aqueous alkaline extract of said peat moss and filtering said reaction mixture to remove non-dissolved substances therefrom whereby to recover a filtrate consisting of said aqueous alkaline extract;

adding to said filtrate a strong acid in an amount effective to precipitate humic acid and partially humified material and to leave fulvic acid dissolved therein and then separating said precipitate from the liquid;

subjecting the liquid to ion-exchange dialysis to remove unreacted acid and the reaction product thereof with said alkali;

adding to said dialyzed liquid in an aqueous solution of a strong alkali and then adding an aqueous solution of an alkaline earth metal salt to substantially neutralize said dialyzed liquid whereby to form water-insoluble fine flocs of alkaline earth metal salts of fulvic acid, then adding to and mixing with the thus-treated dialyzed liquid an organic coagulant for said flocs whereby to coagulate said flocs;

then filtering the coagulated flocs from said dialyzed liquid and drying said coagulated flocs to obtain a particulate material useful as an organic soil conditioner.

13. A process according to claim 12 wherein said aqueous solution of a strong alkali is an aqueous solution of caustic soda, caustic potash, ammonia or red mud by-product of the aluminum industry, or an industrial waste water of strong alkalinity.

14. A process according to claim 13 wherein said alkaline earth metal salt is a calcium or magnesium salt.

15. A process according to claim 13 wherein said alkaline earth metal salt is calcium chloride.

16. A process according to claim 12 wherein said organic coagulant is selected from the group consisting of sodium alginate, carboxymethyl cellulose or polyacrylic amide.

17. A process according to claim 12 wherein said strong acid is hydrochloric acid or sulfuric acid.

18. A process for preparing an organic soil conditioner, which comprises the steps of: obtaining separately two filtrates by agitating, at a temperature of less than 80° C, a reaction mixture consisting essentially of peat moss and an aqueous solution of a strong alkali in an amount equivalent to from 3 to 10% by weight, calculated as $Na_2O$, based on water-free peat moss, for a period of time not more than 30 minutes effective to form an aqueous alkaline extract of said peat moss and filtering said reaction mixture to remove non-dissolved substances therefrom whereby to recover a filtrate consisting of said aqueos alkaline extract;

adding to one of said filtrates a strong acid in an amount effective to precipitate humic acid and partially humified material and to leave fulvic acid dissolved therein and then separating said precipitate from the liquid;

subjecting the liquid to ion-exchange dialysis to remove unreacted acid and the reaction product thereof with said alkali;

adding to said precipitate an aqueous solution of a strong alkali to dissolve said precipitate;

adding to said dialyzed liquid an aqueous solution of a strong alkali;

mixing at least two of (1) the other filtrate, (2) the aqueous alkaline solution of said precipitate and (3) the aqueous alkaline solution of fulvic acid;

adding to the mixture of the liquids obtained in the preceding step an aqueous solution of an alkaline earth metal salt to substantially neutralize the latter mxiture whereby to form water-insoluble fine flocs of alkaline earth metal salts of the constituents of the latter mixture, then adding to and mixing with the thus-treated latter mixture or organic coagulant for said flocs whereby to coagulate said flocs;

then filtering the coagulated flocs from said latter mixture and drying said coagulated flocs to obtain a particulate material useful as an organic soil conditioner.

19. A process according to claim 18 wherein said aqueous solution of a strong alkali is an aqueous solution of caustic soda, caustic potash, ammonia or red mud by-product of the aluminum industry, or an industrial waste water of strong alkalinity.

20. A process according to claim 19 wherein said alkaline earth metal salt is a calcium or magnesium salt.

21. A process according to claim 19 wherein said alkaline earth metal salt is calcium chloride.

22. A process according to claim 18 wherein said organic coagulant is selected from the group consisting of sodium alginate, carboxymethyl cellulose or polyacrylic amide.

23. A process according to claim 18 wherein said strong acid is hydrochloric acid or sulfuric acid.

* * * * *